(12) United States Patent
Hirono

(10) Patent No.: US 6,246,958 B1
(45) Date of Patent: Jun. 12, 2001

(54) APPARATUS AND METHOD FOR PROCESSING INFORMATION AND APPARATUS AND METHOD FOR DISPLAYING IMAGE

(75) Inventor: Chiharu Hirono, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/035,611

(22) Filed: Mar. 5, 1998

(30) Foreign Application Priority Data

Mar. 11, 1997 (JP) .................................................. 09-055863

(51) Int. Cl.[7] ........................... G08G 1/123; G01C 21/00
(52) U.S. Cl. ......................... 701/208; 455/414; 455/457; 340/990; 701/209
(58) Field of Search ................................... 455/412, 414, 455/507, 510, 514, 456, 457; 340/990; 701/207, 202, 208, 209, 210

(56) References Cited

U.S. PATENT DOCUMENTS

| | | | | |
|---|---|---|---|---|
| 5,025,261 | * | 6/1991 | Ohta et al. | 342/357 |
| 5,383,128 | * | 1/1995 | Nishida et al. | 340/990 |
| 5,552,989 | * | 9/1996 | Bertrand | 340/990 |
| 5,724,316 | * | 3/1998 | Brunts | 340/990 |
| 5,739,772 | * | 4/1998 | Nanba et al. | 340/990 |
| 5,802,492 | * | 9/1998 | DeLorme et al. | 340/990 |
| 5,919,245 | * | 7/1999 | Nomura | 701/207 |

* cited by examiner

Primary Examiner—Lee Nguyen
Assistant Examiner—Simon Nguyen
(74) Attorney, Agent, or Firm—Lerner, David, Littenberg, Krumholz & Mentlik, LLP

(57) ABSTRACT

A map database server retaining map data grouped by block is connected to an internet and a provider for providing a connection service with the internet is connected between the internet and a public telephone network. A portable telephone base station connects a portable telephone to the public telephone network by a radio wave as the transmission medium. A car navigation system is connected to the portable telephone and communicates with the map database server through the public telephone network, the internet, and the like to receive map data and the like. The car navigation system allows to be automatically updated only map data and date-time data of the blocks, which are included in specific blocks and with respect to which the dates and times according to the date-time data in the map database server are more recent dates and times than the dates and times according to the date-time data in the flash memory incorporated therein.

11 Claims, 9 Drawing Sheets

APPARATUS AND METHOD FOR PROCESSING INFORMATION AND APPARATUS AND METHOD FOR DISPLAYING IMAGE

BACKGROUND OF THE INVENTION

1. Field of the Invention

The present invention relates to apparatus and method for processing information and apparatus and method for displaying image and, more particularly, relates to apparatus and method for processing information and apparatus and method for displaying image adapted such that date data retained in a database of the dates at which map data of various areas were registered therein are compared with date data corresponding to the map data retained in an apparatus utilized by the user and, on the basis of the comparison, the map data and the date data in the apparatus utilized by the user are each updated automatically.

2. Description of the Related Art

Recently, car navigation systems utilizing the GPS (Global Positioning System) in which a radio wave from a specific artificial satellite is received and the latitude and longitude of a position are calculated have come into wide use. There are many of types of such car navigation systems that read out map data of a specific area from a CD (Compact Disk)-ROM with map data recorded therein by playing back the same with the use of a CD-ROM drive and have the image of the map corresponding to the map data displayed thereon.

However, in order to use the latest map data when utilizing map data recorded in such a CD-ROM, it becomes necessary to buy from time to time the latest version of the CD-ROM with the map data recorded therein. Therefore, such problems arise that the cost therefor increases, the exchanging operation of the CD-ROM becomes necessary, and, even if a latest version is obtained, a certain time period has already elapsed for making up the CD-ROM at the time when it is released, namely, it is difficult to write the map data which were changed while a latest version of the CD-ROM was being manufactured into the latest version.

Accordingly, there is proposed a car navigation system which allows the latest map data to be read out from a specific map database center through a specific transmission medium. In this type of the car navigation system, map data designated by the user is read out from the map database center through, for example, a public telephone line, portable telephone, modem, and the like, and stored into memory.

By adapting such that the latest map data is read out from a specific map database center as described above, the operation for exchanging the CD-ROM can be eliminated. Further, by having the map data in the map database center updated when a change occurs in the map, the car navigation system is enabled, upon selection of such map data by the user, to read out the selected map data and, hence, it becomes possible to provide the car navigation system with more recent map data than that distributed by a CD-ROM.

However, if it is practiced that the map data designated by the user is read out from the map database and stored into memory, there arises a problem that such an operation must be performed every time as to select the map data of the area required by the user out of a huge map database covering the whole of the country.

SUMMARY OF THE INVENTION

The invention was made in view of the above described situation and it is an object of the invention, by having map data as well as the dates at which the map data were registered retained in a database and, further, storing map data and date data corresponding to the map data in a car navigation system, to update each of the map data and the date data in the car navigation system on the basis of results of comparison of date data in the car navigation system with date data in the database, in accordance with the map data and date data in the database, to thereby allow only outdated map data to be updated automatically without the need for the user to make complicate operations.

The apparatus for processing information set forth in claim 1 is characterized by comprising data retaining means for retaining N pieces of map data corresponding to specific N areas and N pieces of date data each thereof representing the date at which the map data of each area was registered, receiving means for receiving a command making a demand for the map data of a specific area or the date data, and transmitting means for transmitting the map data or date data designated by the command.

The method for processing information set forth in claim 6 is characterized by comprising the steps of receiving a command making a demand for certain map data or date data out of N pieces of map data corresponding to specific N areas and N pieces of date data each thereof representing the date at which the map data of each area was registered retained in a specific data retaining portion, and reading out the map data or date data designated by the command from the data retaining portion and transmitting the data.

The apparatus for displaying image set forth in claim 7 is characterized by comprising communication means for communicating with an apparatus for processing information retaining N pieces of map data corresponding to specific N areas and N pieces of date data each thereof representing the date at which the map data of each area was registered, retaining means for retaining N pieces of map data and date data each thereof corresponding to each of the map data, display means for displaying an image corresponding to the map data retained in the data retaining means, and control means for controlling the communication means and data retaining means thereby selecting an area for which the date according to the date data in the apparatus for processing information is more recent than the date according to the date data in the data retaining means and updating each of the map data and the date data corresponding to the selected area in the data retaining means in accordance with the map data and date data corresponding to the selected area in the apparatus for processing information.

The method for displaying image set forth in claim 16 is characterized by comprising the steps of demanding the date data from an apparatus for processing information retaining N pieces of map data corresponding to specific N areas and date data each thereof representing the date at which the map data of each area was registered, receiving the date data transmitted from the apparatus for processing information, reading out date data from the data retaining portion, comparing the date according to the date data from the apparatus for processing information and the date according to the date data from the data retaining portion, demanding, from the apparatus for processing information, map data of an area with respect to which the date according to date data from the apparatus for processing information is more recent than the date according to date data from the data retaining portion, receiving the map data transmitted from the apparatus for processing information, updating the map data in the data retaining portion of the area corresponding to the received map data in accordance with the received map data, and updating the date data in the data retaining portion of the area corresponding to the received map data in accordance with the date data corresponding to the received map data.

In the apparatus for processing information set forth in claim 1, data retaining means retains N pieces of map data corresponding to specific N areas and N pieces of date data each thereof representing the date at which the map data of each area was registered, receiving means receives a command making a demand for the map data of a specific area or the date data, and transmitting means transmits the map data or date data designated by the command.

In the method for processing information set forth in claim 6 a command making a demand for certain map data or date data out of N pieces of map data corresponding to specific N areas and N pieces of date data each thereof representing the date at which the map data of each area was registered retained in a specific data retaining portion is received and the map data or date data designated by the command is read out from the data retaining portion and transmitted.

In the apparatus for displaying image set forth in claim 7, communication means communicates with an apparatus for processing information retaining N pieces of map data corresponding to specific N areas and N pieces of date data each thereof representing the date at which the map data of each area was registered, retaining means retains N pieces of map data and date data each thereof corresponding to each of the map data, and display means displays an image corresponding to the map data retained in the data retaining means. Further, control means controls the communication means and data retaining means to thereby select an area for which the date according to the date data in the apparatus for processing information is more recent than the date according to the date data in the data retaining means and update each of the map data and the date data corresponding to the selected area in the data retaining means in accordance with the map data and date data corresponding to the selected area in the apparatus for processing information.

In the method for displaying image set forth in claim 16, date data is demanded from an apparatus for processing information retaining N pieces of map data corresponding to specific N areas and date data each thereof representing the date at which the map data of each area was registered and date data transmitted from the apparatus for processing information is received. Then, date data is read out from the data retaining portion, the date according to the date data from the apparatus for processing information and the date according to the date data from the data retaining portion are compared with each other, map data of an area with respect to which the date according to date data from the apparatus for processing information is more recent than the date according to date data from the data retaining portion is demanded from the apparatus for processing information, the map data transmitted from the apparatus for processing information is received, the map data in the data retaining portion of the area corresponding to the received map data is updated in accordance with the received map data, and the date data in the data retaining portion of the area corresponding to the received map data is updated in accordance with the date data corresponding to the received map data.

DESCRIPTION OF THE PREFERRED EMBODIMENTS

Figure 1:
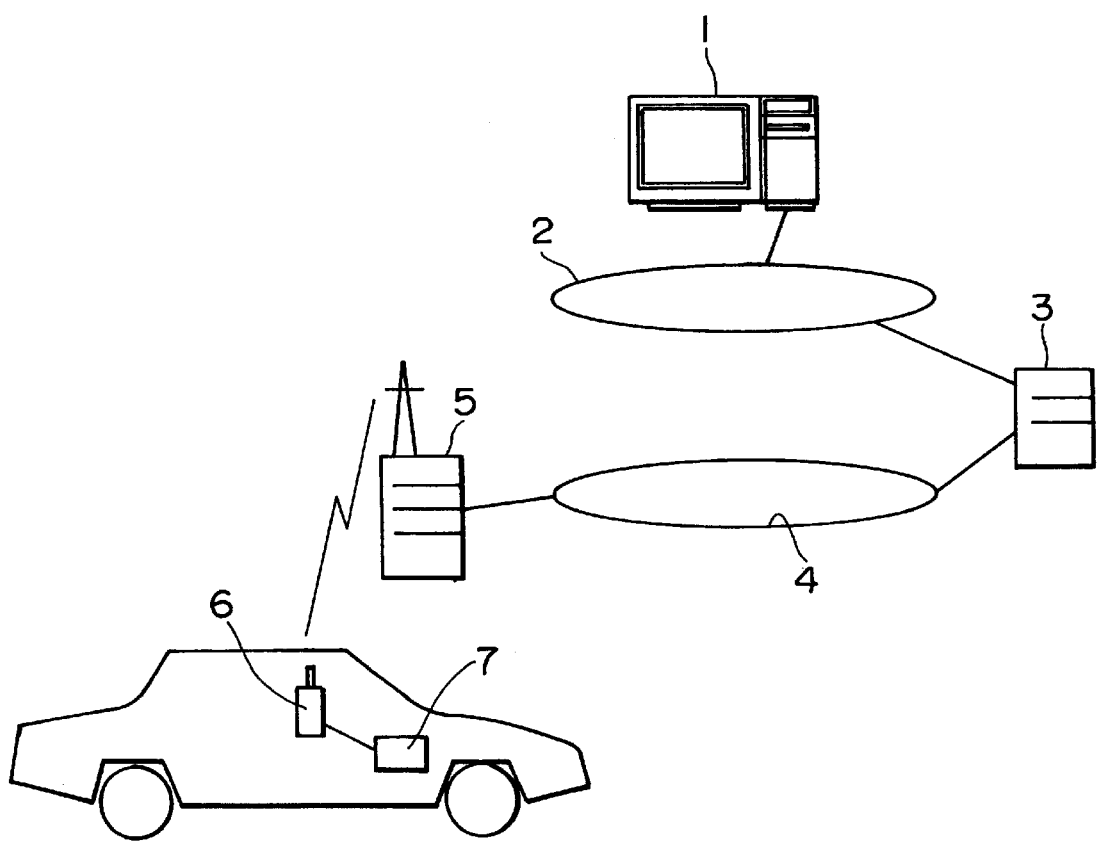
FIG. 1 is a block diagram showing an example of structure of an information provision system for providing a car navigation system mounted on a motor vehicle with map data.

FIG. 1 shows an example of structure of an information provision system for providing map data for a car navigation system 7 mounted for example on a motor vehicle. In the information provision system, a map database server 1 retaining map data is connected with an internet 2 and a provider 3 providing a connection service with the internet 2 for users utilizing a telephone line is connected between the internet 2 and a public telephone network (telephone line) 4.

A portable telephone base station 5 in connection with the public telephone network 4 communicates with a portable telephone 6 using a radio wave as the transmission medium.

The car navigation system 7 allows the map data corresponding to the latitude and longitude calculated by a GPS receiver (position detection means) 41 incorporated therein to be displayed on a display (display means) 45 (FIG. 5) and, at the same time, communicates with the map database server 1 through the internet 2, provider 3, public telephone network 4, portable telephone base station 5, and the portable telephone 6 to receive map data and the like.

Figure 2:
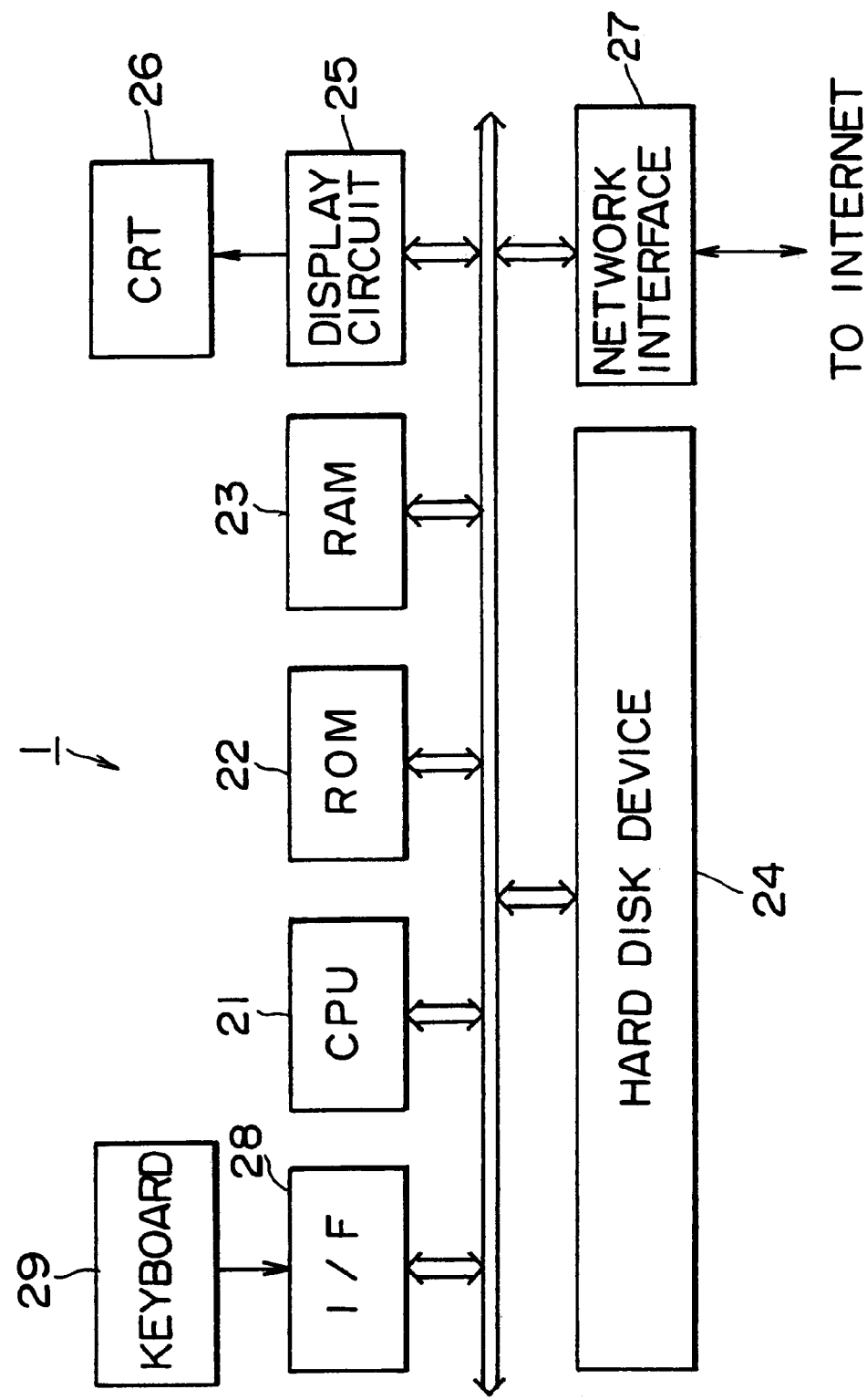
FIG. 2 is a block diagram showing an example of structure of a map database server to which an apparatus for processing information of the invention is applied.

FIG. 2 shows an example of structure of the map database server 1 to which the apparatus for processing information of the invention is applied. In the map database server 1, the CPU (Central Processing Unit) 21 (receiving means, transmitting means) is adapted to make various types of processing according to programs recorded in a ROM (Read Only Memory) 22 or a hard disk device (data retaining means) 24.

The ROM 22 retains for example the program to be executed when the apparatus is started up and various data.

A RAM (Random Access Memory) 23 is adapted to temporarily store data and programs while processing is being made by the CPU 21.

Figure 3:
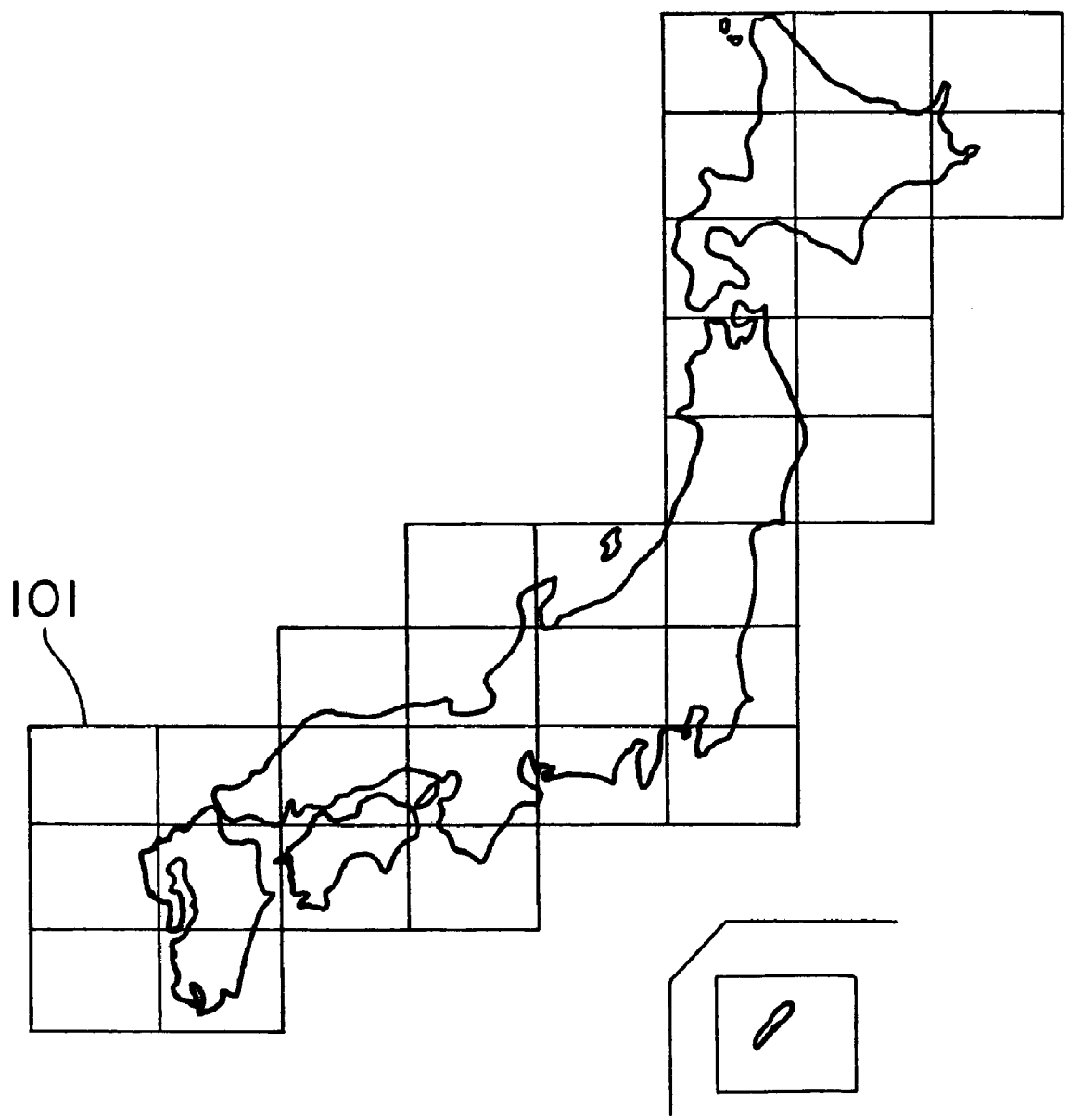
FIG. 3 is a diagram showing an example of blocks into which the whole of Japan is divided.

The hard disk device 24 retains a server program and, further, retains map data of specific areas and date-time data (date data) showing the dates and times at which the map data were registered. Namely, in the hard disk device 24, there are retained, as shown in FIG. 3 for example, map data made up for each of the blocks 101 obtained by dividing the whole of Japan by a predetermined number N (N=32 in the case of FIG. 3) and date-time data showing the dates and times at which the map data were registered.

Figure 4:
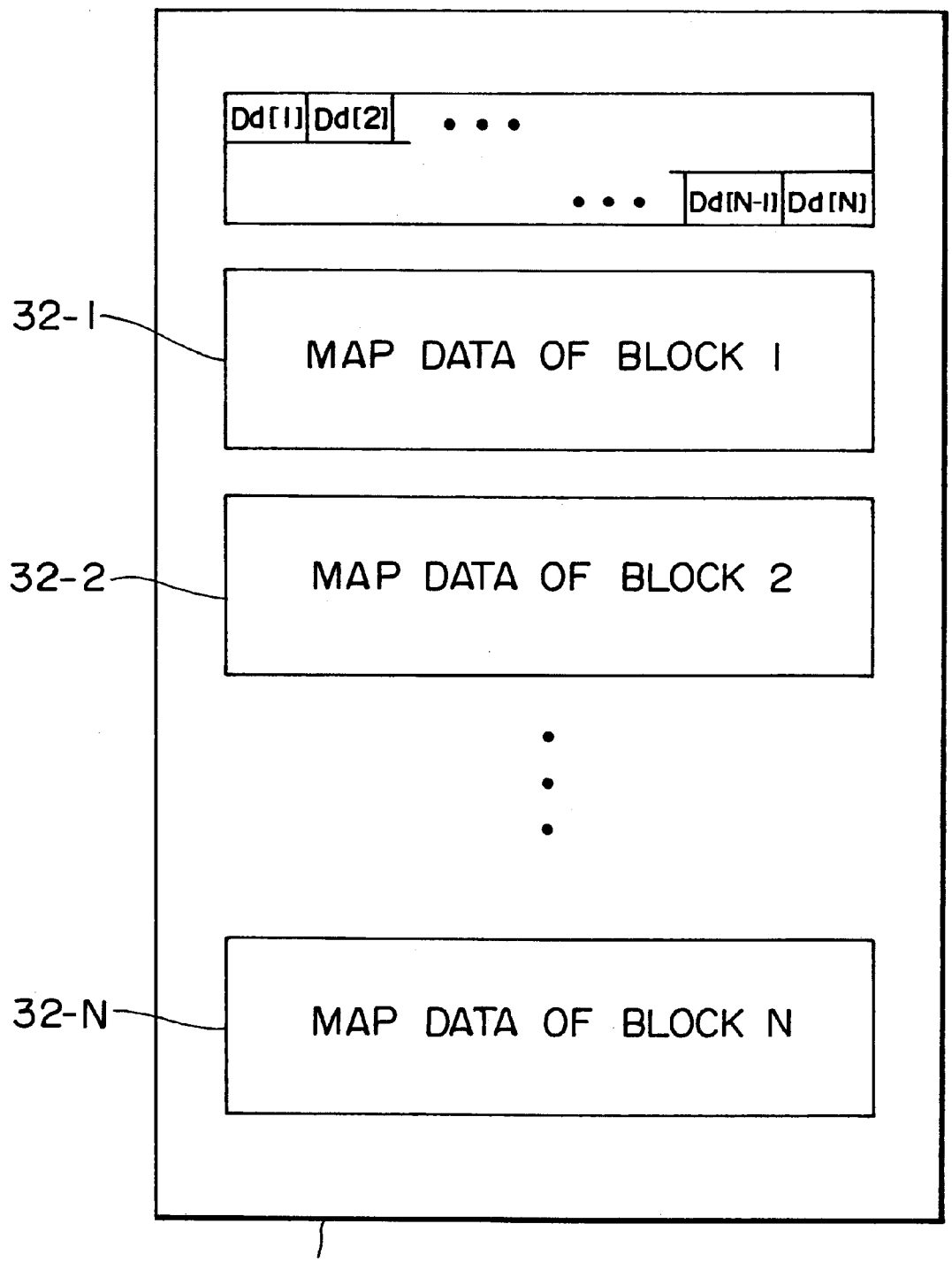
FIG. 4 is a diagram showing an example of map data and date data retained in the hard disk device shown in FIG. 2.

In the hard disk device 24, there are retained, as shown in FIG. 4 for example, map data 32-1 to 32-N corresponding to the blocks 1 to N and date-time data (Dd[1] to Dd[N]) 31 corresponding to the map data 32-1 to 32-N, respectively.

Referring back to FIG. 2, a display circuit 25 is adapted to display an image corresponding to image data supplied from the CPU 21 on a CRT 26.

An interface (I/F) 28 is connected with a keyboard 29 and adapted to supply the CPU 21 with a signal corresponding to an operation made with the keyboard 29 by the manager of the map database server 1. For example, the manager of the map database server 1 is able to have specific data and the like displayed on the CRT 26 and operate the keyboard 29 to register map data in the hard disk device 24.

A network interface 27 is connected to the internet 2 and adapted to receive a packet addressed to the map database server 1 and also to generate a packet from data supplied from the CPU 21 in accordance with the IP (Internet Protocol) and output the packet to the internet 2.

Figure 5:
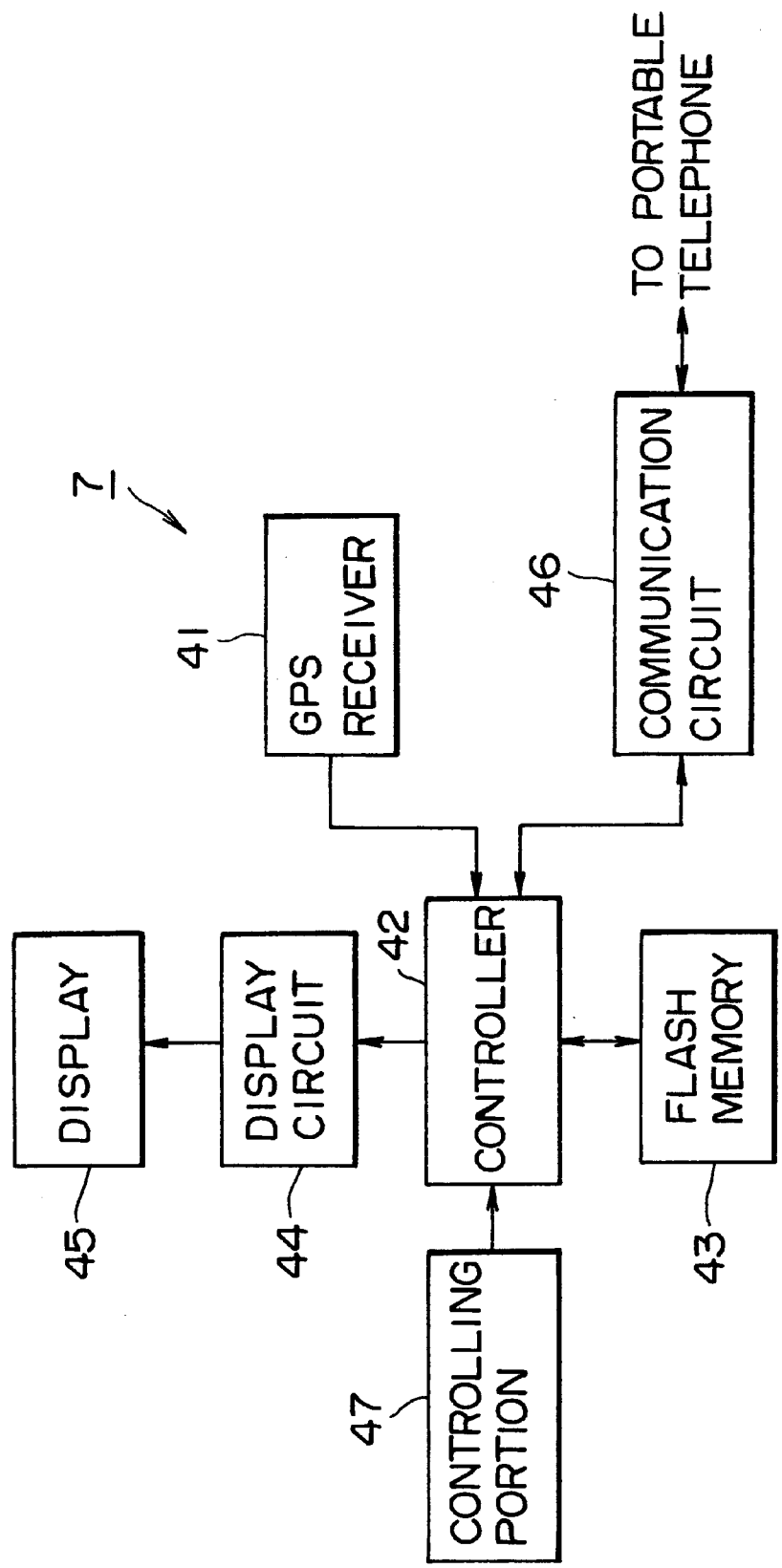
FIG. 5 is a block diagram showing an example of structure of a car navigation system to which an apparatus for displaying image of the invention is applied.

FIG. 5 shows an example of structure of a car navigation system 7 to which the apparatus for displaying image of the invention is applied. In the car navigation system 7, the GPS receiver 41 is adapted to receive a radio wave from a specific artificial satellite, calculate the latitude and longitude corresponding to the present position of the GPS receiver 41, and output such information to a controller (control means, selection means, and second setting means) 42.

The controller 42 is adapted to read out map data recorded in a flash memory (data retaining means, path retaining means) 43 in response to the operation made by the user with a controlling portion (setting means) 47 and control a display circuit 44 to allow an image corresponding to the map data to be displayed on a display (for example, a liquid crystal display) 45 and, in addition, to communicate with the map database server 1 to read therefrom map data more recent than the map data recorded in the flash memory 43 and suitably update the map data retained in the flash memory 43 and date-time data (date data) corresponding to the map data.

Figure 6:
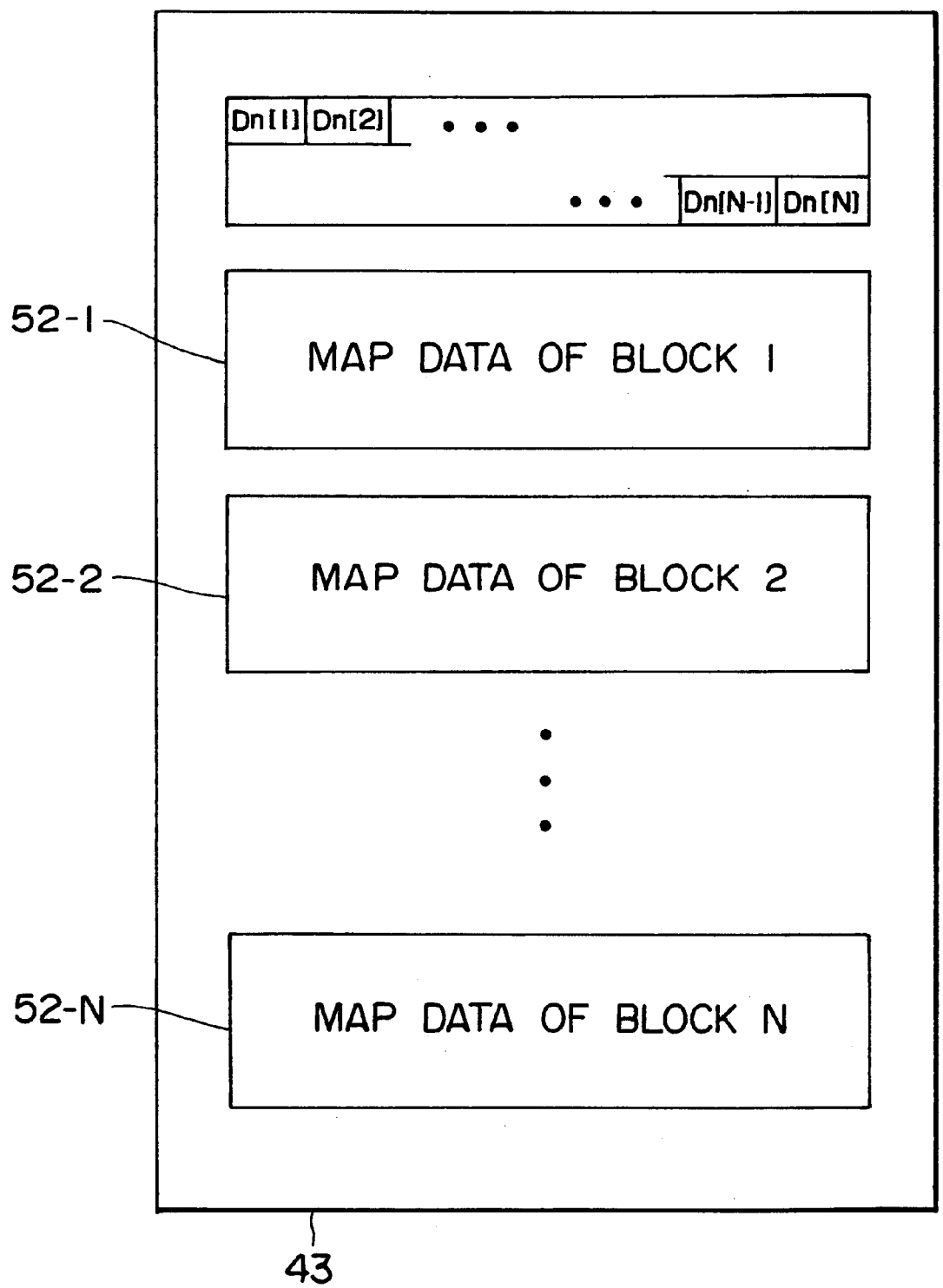
FIG. 6 is a diagram showing an example of map data and date data retained in the flash memory shown in FIG. 5.

The flash memory 43 is a nonvolatile memory and retains, as shown in FIG. 6 for example, map data 52-1 to 52-N of specific N areas and date-time data (Dn[1] to Dn[N]) 51 corresponding to the map data 52-1 to 52-N.

A communication circuit (communication means) 46 is connected with the portable telephone 6 and adapted to establish a connection with the provider 3, generate a modulated signal corresponding to data supplied from the controller 42, and transmit it to the provider 3 through the public telephone network 4 and, further, to receive a modulated signal sent from the provider 3 over the public telephone network 4 and demodulate the modulated signal to output the data generated thereby to the controller 42.

Figure 7:
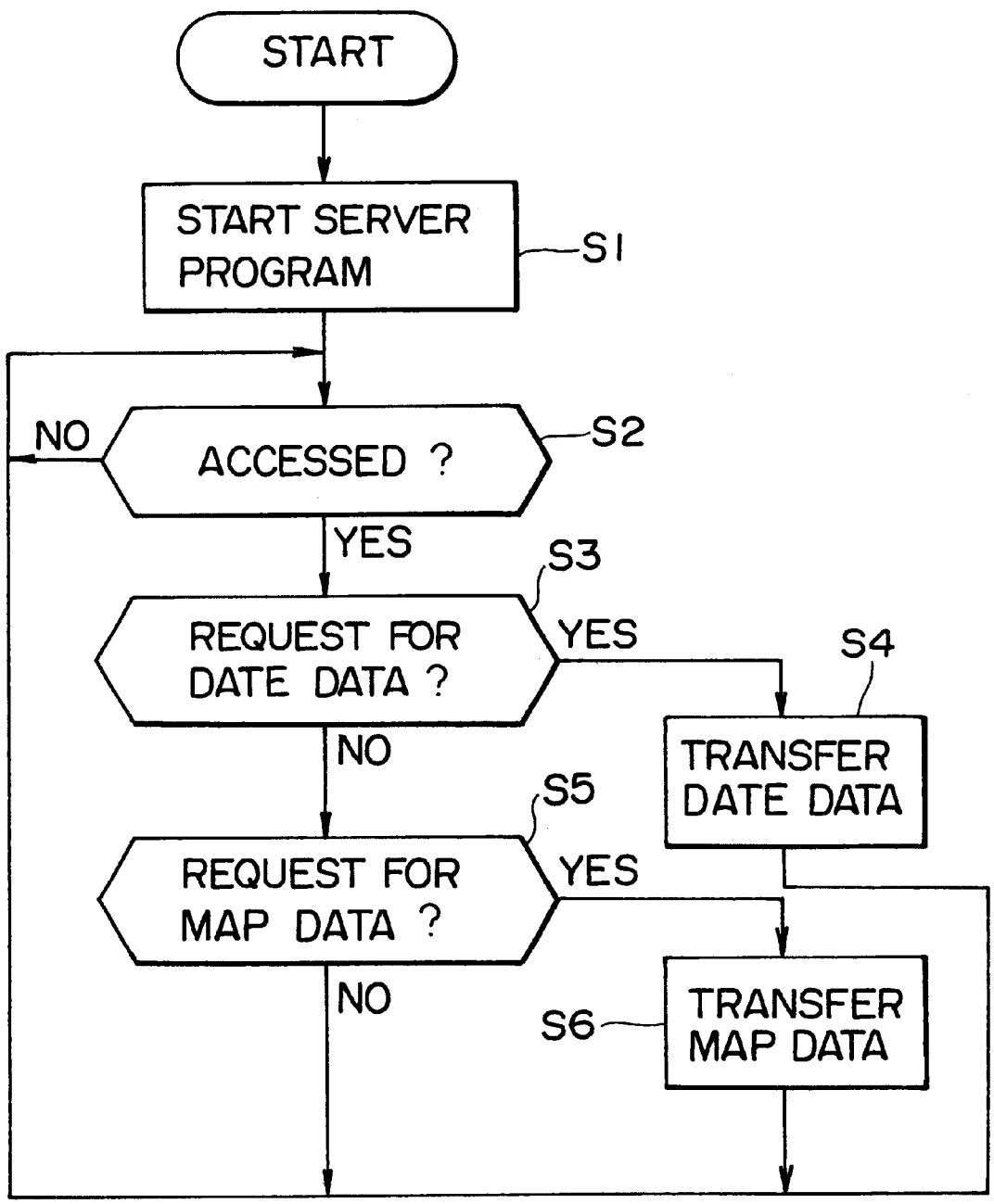
FIG. 7 is a flowchart explanatory of operations of the map database server shown in FIG. 2.

Now, referring to the flowchart of FIG. 7, operations of the map database server 1 will be described.

At the time of starting up in step S1, the CPU 21 of the map database server 1 executes the server program retained in the hard disk device 24.

In step S2, the CPU 21, according to the server program, stands by until a packet addressed to the map database server 1 is received by the network interface 27 (namely, until accessed by an apparatus connected to the internet 2).

When a packet addressed to the map database server 1 is received, the CPU 21, advancing to step S3, determines whether the content of the packet is a command making a demand for date-time data (date data) or not. If it judges the content of the packet to be a command making a demand for date-time data, it reads out the date-time data Dd[1] to Dd[N] from the hard disk device 24 and controls the network interface 27 to transmit the date-time data to the apparatus transmitted the command. After the date-time data was transmitted as described above, the CPU 21 returns to step S2 and, again, stands by until accessed.

When, in step S3, the content of the packet is judged to be not a command making a demand for date-time data, the flow proceeds to step S5.

In step S5, the CPU 21 determines whether or not the content of the packet is a command making a demand for map data of a specific block, and when the content of the packet is judged to be a command making a demand for map data of a specific block, it reads out the map data of the block designated by the command from the hard disk device 24 and controls the network interface 27 to transmit the map data to the apparatus which transmitted the command. After having the map data transmitted as described above, the CPU 21 returns to step S2 and, again, stands by until accessed.

On the other hand, when, in step S5, the content of the packet is judged to be not a command making a demand for map data, the CPU 21 returns to step S2 and, again, stands by until accessed.

In the described manner, the map database server 1 transmits the date-time data or the map data retained in the hard disk device 24, in accordance with the content of the packet transmitted over the internet 2, to the apparatus which transmitted the packet.

Figure 8:
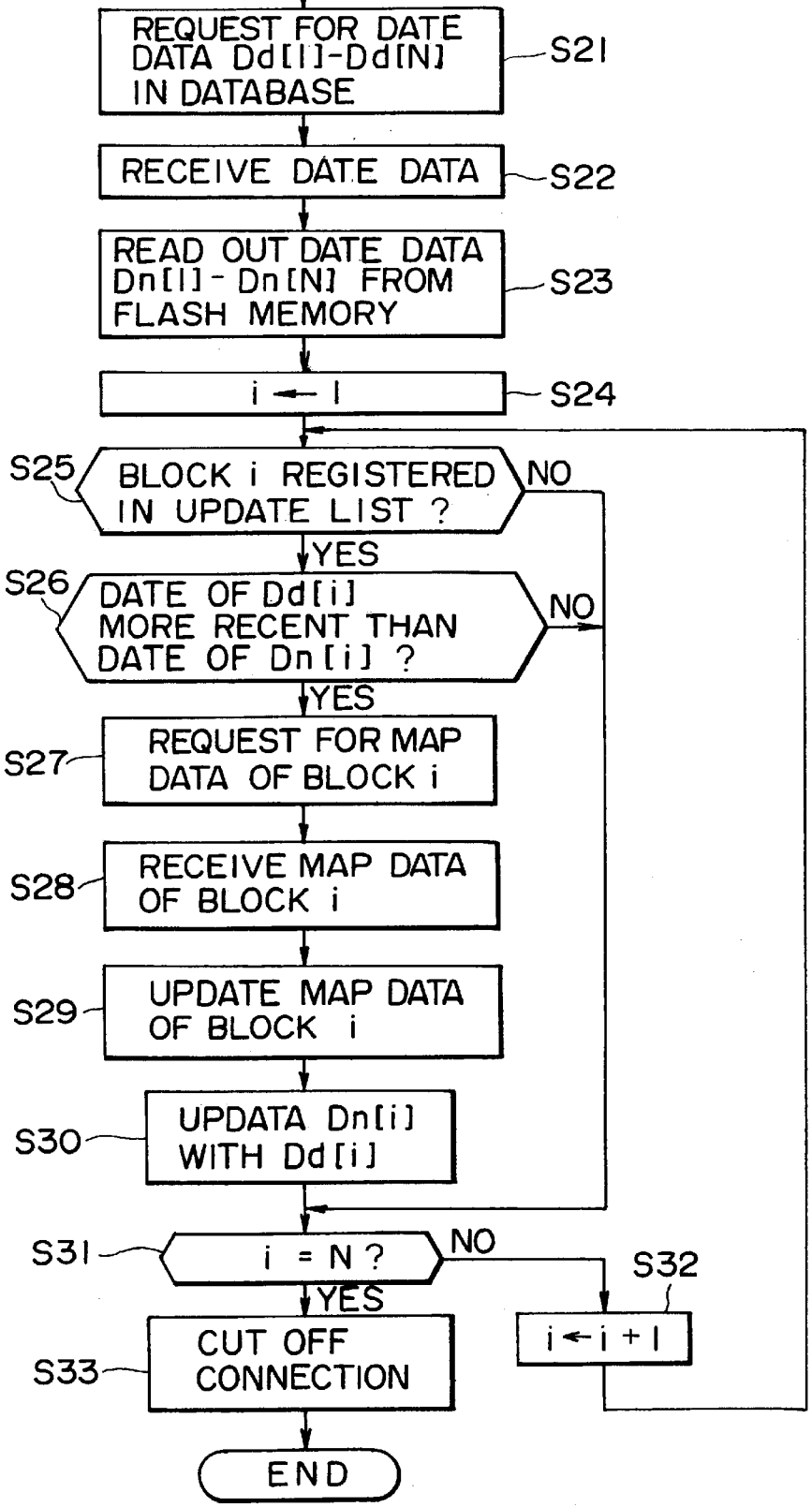
FIG. 8 is a flowchart explanatory of operations of the car navigation system in updating map data.

Now, referring to the flowchart of FIG. 8, operations of the car navigation system 7 for updating map data retained in the flash memory 43 will be described.

First, in step S21, the controller 42 of the car navigation system 7 controls the communication circuit 46 to establish a connection with the provider 3 and, then, to generate a packet, in accordance with the IP, corresponding to a request for date-time data Dd[1] to Dd[N] and transfer it to the map database server 1.

Then, in step S22, the controller 42 receives the date-time data Dd[1] to Dd[N] transmitted from the map database server 1 in response to the command. Then, in step S23, the controller 42 reads out date-time data Dn[1] to Dn[N] from the flash memory 43.

In step S24, the controller 42 sets the value of a counter i for counting the block number to 1.

Then, in step S25, the controller 42 refers to an update list, in which numbers of blocks as objects of updating are registered, and determines whether or not the block i corresponding to the number of the counter i is registered in the update list.

The update list is recorded by the user, for example, in the flash memory 43 in advance. Only the map data and date data corresponding to the blocks of which the numbers are registered in the update list are updated when the condition (described below) in step S26 is satisfied. By using the update list in this way, the need for comparison in step S26 of date data of blocks not registered in the update list can be eliminated.

When it is judged that the block i corresponding to the value of the counter i is registered in the update list, the flow advances to step S26. The controller 42 determines whether or not the date and time according to the date-time data Dd[i] in the map database server 1 corresponding to the block i is more recent date and time than the date and time according to the date-time data Dn[i] in the flash memory 43 and, when it is judged that the date and time according to the Dd[i] is more recent date and time than the date and time of the Dn[i], data updating processing for the block i is made in step S27 to step S30.

Namely, in step S27, the controller 42 transmits a command making a demand for the map data of the block i to the map database server 1. In step S28, the controller 42 receives the map data transmitted thereto in response to the command and, in step S29, writes the received map data of the block i over the map data of the block i recorded in the flash memory 43. Further, the controller 42 writes the date-time data Dd[i] corresponding to the block i of the map database server 1 over the date-time data Dn[i] in the flash memory 43.

After the updating processing of the data corresponding to the block i has been made as described above, the flow advances to step S31.

On the other hand, when it is judged in step S25 that the block i corresponding to the value of the counter i is not registered in the update list, the flow jumps to step S31. In this case, updating processing for the data corresponding to the block i is not made.

Further, when it is determined in step S26 that the date and time according to the date-time data Dd[i] in the map database server 1 is not more recent date and time than the date and time according to the date-time data Dn[i] in the flash memory 43, the flow jumps to step S31. Namely, in this case, updating processing for the data corresponding to the block i is not made.

In step S31, the controller 42 determines whether or not the value of the counter i is equal to the number N of the blocks in the map (i=N), and when it is judged that i is not equal to N, it increments the value of the counter i by 1, and then it returns to step S25 and starts the processing for the block of the next number.

On the other hand, when it is judged that i is equal to N, i=N, because it means that the processing for N blocks has been completed, the controller 42 controls, in step S33, the communication circuit 46 to cut off the connection with the provider 3.

In the described manner, the car navigation system 7 updates such map data and date-time data in the flash memory 43 that correspond to the blocks, which are registered in the update list and of which the dates and times of the date-time data Dd[i] in the map database server 1 are more recent than the dates and times of the date-time data Dn[i] in the flash memory 43.

The update list can be made up in advance by operating the controlling portion 47 so that the blocks to be taken as the objects of updating may be registered. As long as the blocks taken as the objects of updating are kept unchanged, the user is required to do this operation only once at the time before using the apparatus.

Figure 9:
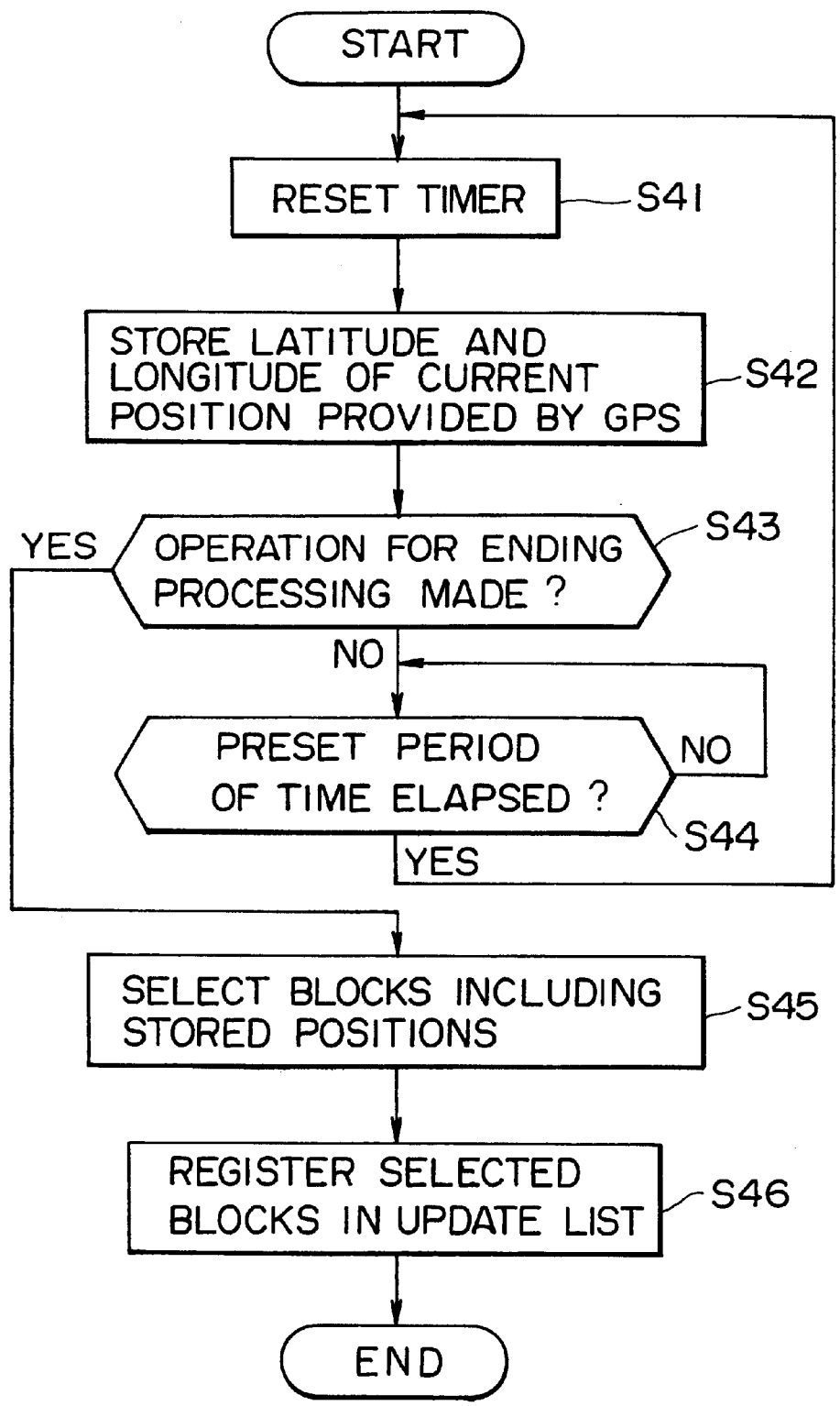
FIG. 9 is a flowchart explanatory of operations of the car navigation system in registering blocks corresponding to a path traveled by a motor vehicle in an update list.

Further, it may be practiced to register in the update list the blocks corresponding to the path traveled by the motor vehicle with the car navigation system 7 mounted thereon. In this case, for example, the blocks corresponding to the path traveled during the period between the timing at which a predetermined operation was made with the controlling portion 47 and the timing at which the next operation was made may be registered in the update list. The operations performed by the car navigation system 7 in registering in the update list the blocks corresponding to the path traveled by the motor vehicle with the car navigation system 7 mounted thereon will be described with reference to the flowchart of FIG. 9.

In step S41, the controller 42 of the car navigation system 7 resets the timer for counting the time interval for detection and retention of the current position of the motor vehicle.

In step S42, the controller 42 causes the flash memory 43 to store the latitude and longitude provided by the GPS receiver 41.

In step S43, the controller 42 determines whether or not the operation with the controlling portion 47 to end the detection of the path has been made and, when it is judged that the operation to end the detection of the path has not yet been made, it proceeds to step S44, wherein it, referring to the value of the timer, stands by until the time period corresponding to the preset time interval elapses.

When the time period has elapsed, the controller 42, returning to step S41, resets the timer and, thereafter, causes the flash memory 43 to store the latitude and longitude, in succession, corresponding to the current position.

Thus, until it is judged that the operation with the controlling portion 47 to end the detection of the path has been made, the latitude and longitude corresponding to the current position are stored in the flash memory 43 every time the preset time period elapses.

On the other hand, when it is judged in step S43 that the operation with the controlling portion 47 to end the detection of the path has been made, the controller 42, advancing to step S45, selects the blocks including the positions in the path on the basis of the latitude and longitude of each position in the path stored in the flash memory 43. Namely, the block including the starting point or the ending point of the path and the blocks through which the path goes are selected.

Then, in step S46, the controller 42 registers the thus selected blocks in the update list in the flash memory 43.

Thus, the blocks corresponding to the path traveled by the motor vehicle are registered in the update list. After the update list has been made up in the described manner, the earlier described data updating processing is made. Then, when more recent map data are registered in the map database server 1, only the data corresponding to the blocks including the path are updated in accordance with the data in the map database server 1. Thus, the updated blocks are limited to the blocks corresponding to the path selected by the user and, hence, the amount of transferred data for updating the data are decreased and the updating processing can be finished in a short period of time.

Although the above described updating processing is made when the user performs predetermined operations with the controlling portion 47, it may also be adapted such that the controller 42 causes a separate timer to operate and the above described updating processing (FIG. 8) is made at intervals of a preset time period.

Otherwise, two update lists, for example, may be prepared so that the blocks registered in one update list may be subjected to the above described updating processing at intervals of a first period (one month, for example) and the blocks registered in the other update list may be subjected to the updating processing at intervals of a second period different from the first period (one year, for example).

Although, in the above described embodiment, the internet 2 was utilized for communication between the map database server 1 and the car navigation system 7, by having a receiving circuit for receiving a radio wave of satellite broadcasting or an FM radio wave installed on the car navigation system 7, map data and date-time data may be supplied to the car navigation system 7 by means of data broadcasting using such radio wave. In this case, since the car navigation system 7 does not transmit any request to the side of the map database server, it may be adapted such that the map database side transmits all the data repeatedly and the receiver side (the car navigation system 7) stores therein only necessary data out of such transmitted data.

Data may also be provided by utilizing radio-beacons installed on the roadside and the like. In this case, only the data of the areas currently traveled and to be traveled later may be transmitted.

According to the apparatus and the method for processing information of the present invention, as described in the foregoing, since it is adapted such that a command making a demand for any map data or date data out of N pieces of map data corresponding to specific N areas and N pieces of date data each thereof representing the data at which the map data of each area was registered retained in a specific data retaining portion is received and map data or date data designated by the command is read out from the data retaining portion and transmitted, it is required to transmit only the map data used for updating and, hence, the amount of transmitted data can be reduced.

According to the apparatus and the method for displaying image of the present invention, as described in the foregoing, since it is adapted such that the map data of such an area is demanded from the apparatus for processing information, that satisfies the condition that the date according to the date data corresponding to the area retained in an apparatus for processing information, retaining N pieces of map data corresponding to specific N areas and N pieces of date data each thereof representing the data at which the map data of each area was registered, is more recent than the date according to the date data corresponding to the area retained in a data retaining portion and, then, each of the map data and the date data in the data retaining portion of the area corresponding to the map data is updated in accordance with the map data and the date data in the apparatus for processing information, outdated updated can be updated automatically without the need for complicate operations made by the user.

What is claimed is:

1. A car-navigation system, comprising
    communication means adapted to communicate with an information processing apparatus having first map data corresponding to specific areas and first date data representing the date on which said first map data of each of said specific areas was registered;
    retaining means for retaining second map data corresponding to said specific areas and second date data representing the date on which the second map data of each of said specific areas was registered;
    a display for displaying an image corresponding to said second map data; and
    control means for transmitting said second date data via said communication means from said retaining means to the information processing apparatus, comparing a date according to said second date data with a date according to said first date data, selecting from said first map data map data of one of said specific areas for which said data according to said first date data is a more recent date than said date according to said second date data, and updating said second map data for said one of said selected areas with said selected map data.

2. A car-navigation system according to claim 1, wherein said communication means handles communication in accordance with an internet protocol.

3. A car-navigation system according to claim 1, wherein said communication means communicates with said information processing apparatus through a telephone line.

4. A car-navigation system according to claim 1, wherein said communication means receives said first map data or said first date data transmitted from said information processing apparatus by means of a radio wave as the transmission medium.

5. A car-navigation system according to claim 1, further comprising setting means for setting an area of said specific areas for which said second map data and said second date data are to be updated when the date according to said first date data is more recent than the date according to said second date data for said area of said specific areas.

6. A car-navigation system to claim 1, wherein said control means, each time a predetermined time period elapses, updates said second map data and said second date data of an area for which the date according to said first date data is a more recent date than the date according to said second date data.

7. A car-navigation system according to claim 1, wherein said control means, each time a predetermined first period of time elapses, updates said second map data and said second date data of a first area within said specific areas, said first area having a date according to said first date data which is a more recent date than a date according to said second date data, and, each time a predetermined second period of time elapses, updates said second map data and said second date data of a second area within said specific areas having a date according to said first date data which is a more recent date than a date according to said second date data.

8. A car-navigation system according to claim 1, further comprising:
    position detection means for detecting a current position;
    path retaining means for retaining a plurality of positions detected by said position detection means;
    selection means for selecting all of said specific areas which include any of said positions retained by said path retaining means; and
    second setting means for setting an area of said specific areas for which said second map data and said second date data are to be updated when the date according to said first date data is a more recent date than the date according to said second date data for said area of said specific areas.

9. A car-navigation system according to claim 1, wherein:
    said information processing apparatus retains data representing a date and time at which each first map data was registered as said first date data;
    said retaining means retains data representing a date and time at which each second map data was registered as said second date data; and
    said control means updates said second map data and said second date data for specific areas having a date and time according to said first date data having a more recent date and time than a date and time of said second date data.

10. A method for displaying image for displaying an image corresponding to map data of an area selected by the user from a data retaining portion retaining specific N pieces of map data and N pieces of date data corresponding to said map data, said method for displaying image comprising the steps of:
    demanding said date data from an apparatus for processing information retaining N pieces of map data corresponding to specific N areas and date data each thereof representing the date at which said map data of each area was registered;
    receiving said date data transmitted from said apparatus for processing information;
    reading out date data from said data retaining portion;
    comparing the date according to the date data from said apparatus for processing information and the date according to the date data from said data retaining portion;

demanding, from said apparatus for processing information, map data of an area with respect to which the date according to date data from said apparatus for processing information is more recent than the date according to date data from said data retaining portion;

receiving said map data transmitted from said apparatus for processing information;

updating said map data in said data retaining portion of the area corresponding to the received map data in accordance with the received map data; and updating said date data in said data retaining portion of the area corresponding to the received map data in accordance with the date data corresponding to the received map data.

11. A method for displaying an image corresponding to an area selected by the user, comprising:

demanding first date data from an information processing apparatus retaining first map data corresponding to specific areas and first date data corresponding to said first map data, said first date data representing the date on which said first map data of said specific areas were registered;

receiving at a data retaining portion said first date data transmitted from said information processing apparatus;

reading out second date data from said data retaining portion;

comparing a date according to said first date data with a date according to said second date data;

demanding from said information processing apparatus first map data of a first specific area having a date according to said first date data which is a more recent date than a date according to said second date data;

receiving said first map data of said first specific area at said data retaining portion transmitted from said information processing apparatus;

updating said second map data of said first specific area; and updating said second date data of said first specific area.

* * * * *

UNITED STATES PATENT AND TRADEMARK OFFICE
CERTIFICATE OF CORRECTION

PATENT NO.    : 6,246,958 B1
DATED         : June 12, 2001
INVENTOR(S)   : Hirono It is certified that error appears in the above-identified patent and that said Letters Patent is hereby corrected as shown below:

Column 1,
Line 24, after "many" delete "of".

Column 6,
Line 1, insert -- that -- before "transmitted".

Column 9,
Line 31, "complicate" should read -- complicated --.
Line 51, delete the second occurrence of "map data".

Column 10,
Line 7, after "system" insert -- according --.
Line 50, after the first occurrence of "displaying" delete "image for displaying".

Signed and Sealed this

First Day of April, 2003

JAMES E. ROGAN
*Director of the United States Patent and Trademark Office*